(12) United States Patent
Chao

(10) Patent No.: US 6,789,664 B1
(45) Date of Patent: Sep. 14, 2004

(54) EYEGLASS CASES HAVING TIMEPIECES AND EYEGLASS CASES HAVING MIRRORS

(75) Inventor: David Chao, Los Altos, CA (US)

(73) Assignee: Contour Optik, Inc., Chiayi (TW)

( * ) Notice: Subject to any disclaimer, the term of this patent is extended or adjusted under 35 U.S.C. 154(b) by 0 days.

(21) Appl. No.: 09/847,527

(22) Filed: May 1, 2001

Related U.S. Application Data (63) Continuation-in-part of application No. 09/775,156, filed on Feb. 1, 2001, and a continuation-in-part of application No. 09/625,748, filed on Jul. 26, 2000, and a continuation-in-part of application No. 09/607,265, filed on Jun. 30, 2000, now Pat. No. 6,270,274.

(51) Int. Cl.⁷ .............................................. B65D 85/38
(52) U.S. Cl. ......................................... 206/5; 220/4.04
(58) Field of Search ............................ 206/37, 38, 234, 206/5, 5.1, 6; D9/337; 220/8, 4.21, 4.04–4.07

(56) References Cited

U.S. PATENT DOCUMENTS

| | | | | |
|---|---|---|---|---|
| 2,129,480 A | * | 9/1938 | Schlacht | 206/37 |
| 2,529,764 A | * | 11/1950 | Dufilho | 206/38 |
| 3,822,780 A | * | 7/1974 | Ulmer et al. | 206/5.1 |
| 4,744,461 A | * | 5/1988 | Lapham | 206/5 |
| 4,782,941 A | * | 11/1988 | Freise | 206/5 |
| 4,951,811 A | * | 8/1990 | Lines | 206/5 |
| 5,002,179 A | * | 3/1991 | Dhalla | 206/5.1 |
| 5,201,431 A | * | 4/1993 | Berger et al. | 368/278 |
| 5,929,967 A | * | 7/1999 | Conner | 206/5 |
| D431,323 S | * | 9/2000 | Mills-Kaplan et al. | D28/76 |
| 6,145,986 A | * | 11/2000 | Conner | 206/5 |
| 6,170,651 B1 | * | 1/2001 | Taormina | 206/5 |
| 6,270,274 B1 | * | 8/2001 | Chao | 401/195 |

* cited by examiner

Primary Examiner—John G. Weiss
Assistant Examiner—Michael J. Fisher
(74) Attorney, Agent, or Firm—Greenberg Traurig LLP (57) ABSTRACT

The present invention is directed to cases for storing eyeglasses also having an item such as a mirror, thermometer, compass, laser pointer, or timepiece included in its structure.

4 Claims, 13 Drawing Sheets

EYEGLASS CASES HAVING TIMEPIECES AND EYEGLASS CASES HAVING MIRRORS

RELATED APPLICATIONS

The present application is a continuation-in-part of U.S. application Ser. No. 09/607,265 filed Jun. 30, 2000, now U.S. Pat No. 6,270,274 and a continuation-in-part of U.S. application Ser. No. 09/625,748 filed Jul. 26, 2000, co-pending, and a continuation-in-part of U.S. application Ser. No. 09/775,156 filed Feb. 1, 2001.

FIELD OF THE INVENTION

The present invention is directed to eyeglass cases for storing eyeglasses. The containers are provided with gauges to measure a parameter, such as a timepiece.

BACKGROUND OF THE INVENTION

There are containers disclosed in the prior art that may or may not have another purpose associated with it, such as an attached writing instrument, or storing another item, or providing information on a prevailing aspect of the moment, such as temperature or time.

SUMMARY OF THE INVENTION

The present invention is directed to novel containers used to store eyeglasses. The containers have an interior space for storing eyeglasses. Either on an exterior surface of the container, or inside the container, it is provided with an item. The item may be a gauge for measuring or detecting a parameter, such as a clock or a thermometer, and it could also be a compass. The item may also be a light source such as a flashlight or laser pointer.

DETAILED DESCRIPTION OF THE PREFERRED EMBODIMENT

FIGS. 1–6 show a container 210 having a first end 214 and a second end 216 with a barrel therebetween 218. Together, the ends and barrel define an interior space in which eyeglasses can be stored. The barrel has a partition that intersects the length dimension of the container and divides the container into first and second components 215, 217, on which the first and second ends 214, 216 are respectively located. The first and second components 215, 217 can be separated from each other at the partition 219 to allow access to the interior space, at which time the eyeglasses or other item can be removed or placed in the interior space. The barrel 218 may be provided with a band or ring 220 located at the partition 219. The band or ring may be positioned on the first component, the second component, or both. When the first and second components are joined, the interior space is sealed from the outside environment. The inner edges of the first and second components 215, 217 may be provided with complimentary profiles to facilitate joinder of the components. For instance, the first component 215 may be provided with a portion having a perimeter that fits within the perimeter of the second component 217 and frictionally engages therewith. This arrangement can also be reversed.

A timepiece, such as a digital clock (FIG. 2) or analog clock (FIG. 1) is provided on the first end 214 of the container 210. In an alternative embodiment shown in FIGS. 4 and 5 the timepiece is located on a side of the container 210. The interior space is configured to hold a pair of eyeglasses. In yet a further embodiment, a mirror 250 is provided on the first end 214 of the container 210. See FIG. 1A.

Figure 1:
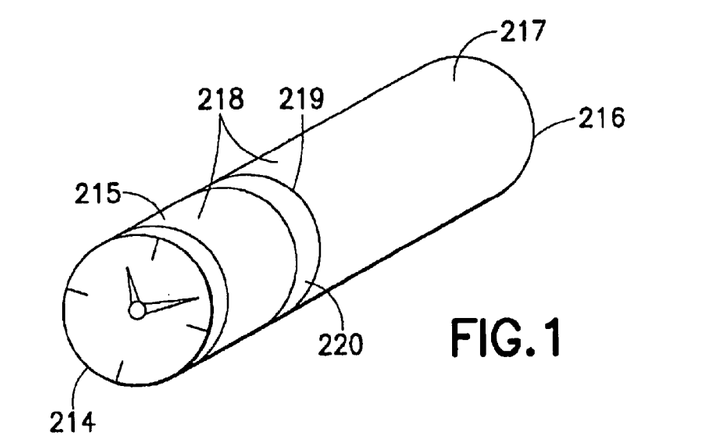
FIG. 1 shows a perspective view of an embodiment of the present invention.
Figure 1A:
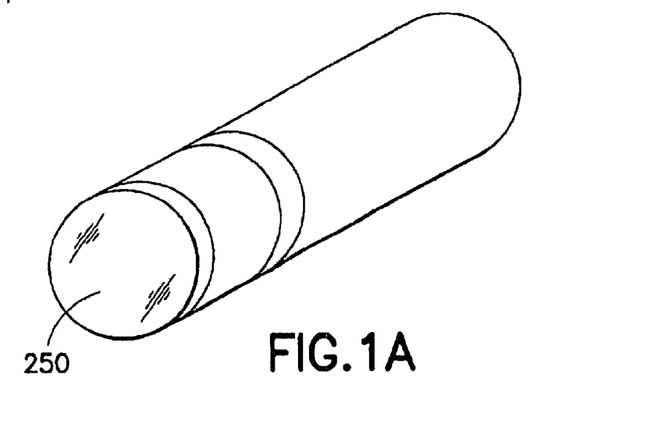
FIG. 1A shows a perspective view of an embodiment of the present invention.
Figure 2:
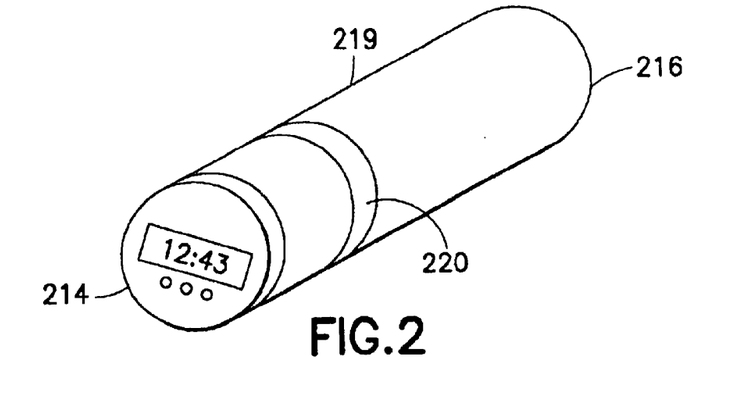
FIG. 2 shows a perspective view of an embodiment of the present invention.
Figure 3:
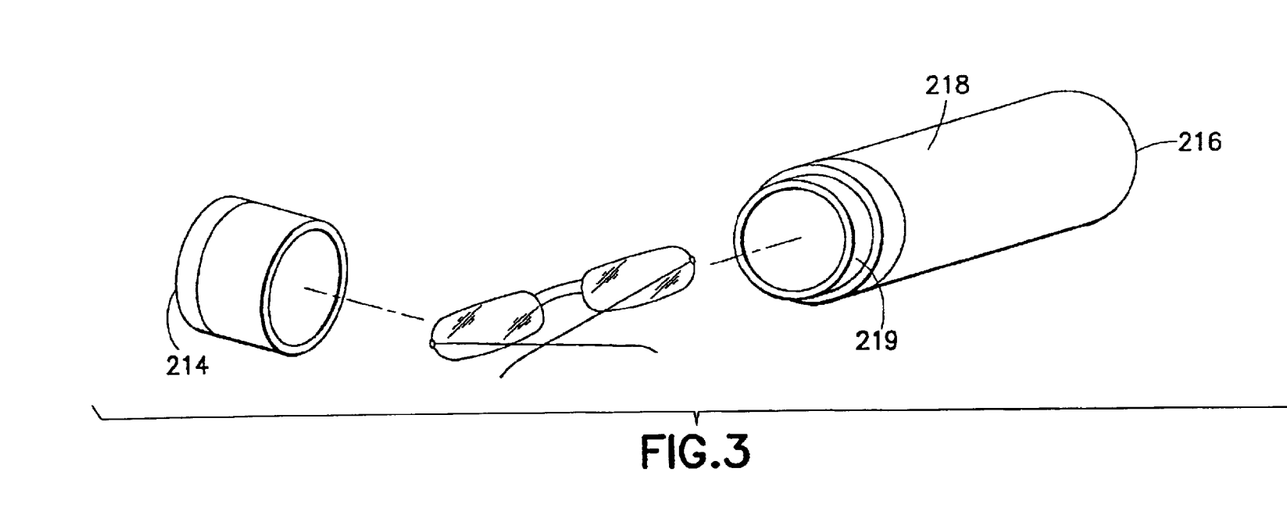
FIG. 3 shows a perspective view of an embodiment of the present invention.
Figure 4:
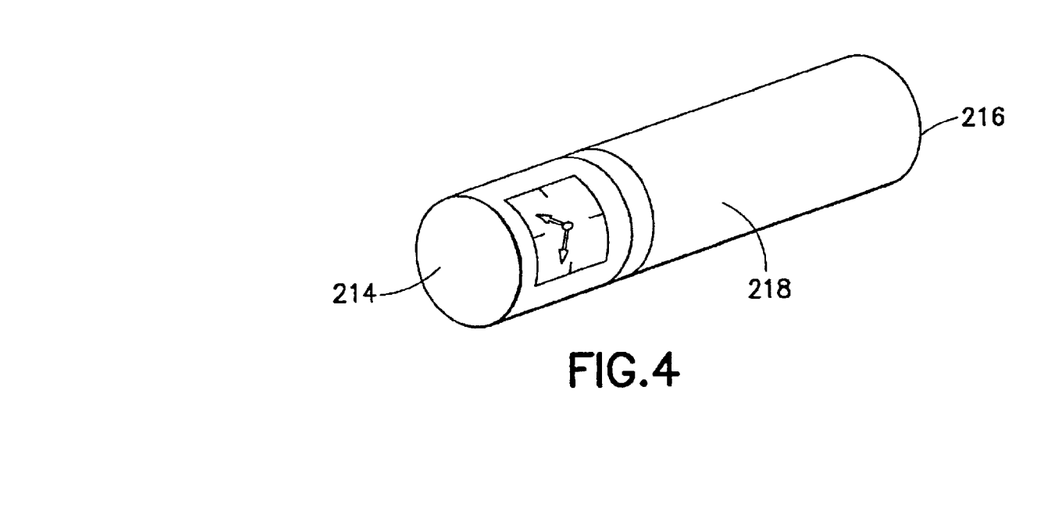
FIG. 4 shows a perspective view of another embodiment of the present invention.
Figure 5:
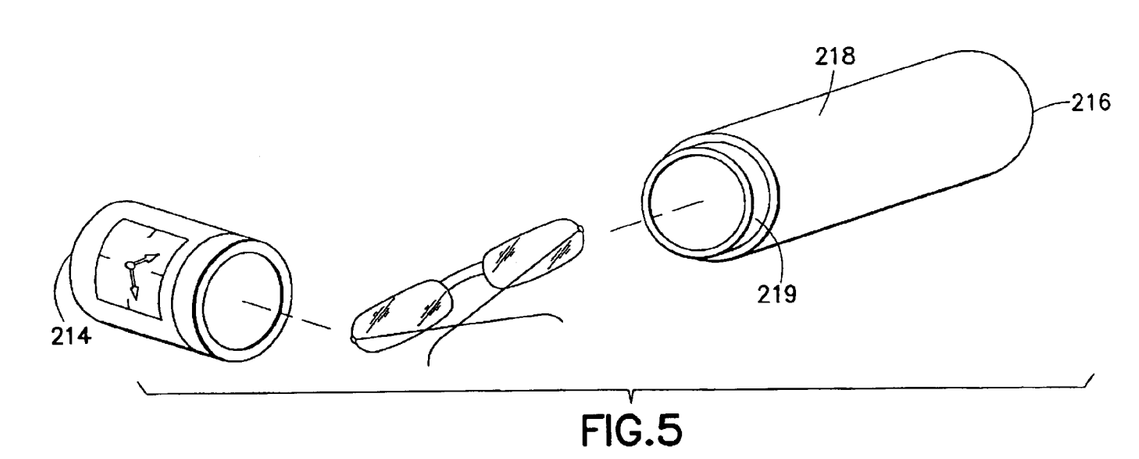
FIG. 5 shows a perspective view of the FIG. 4 embodiment of the present invention.
Figure 6:
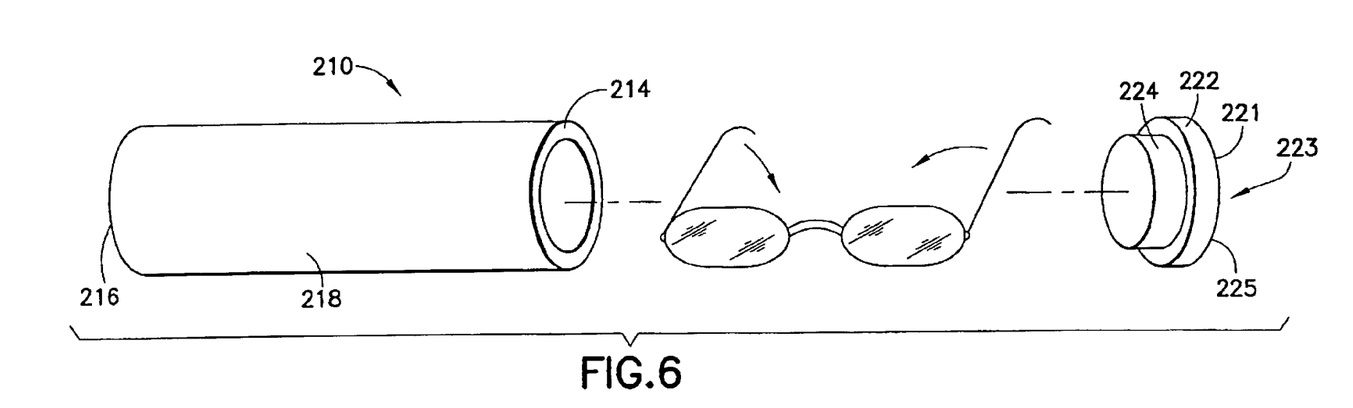
FIG. 6 shows an exploded view of another embodiment of the present invention.
Figure 8:
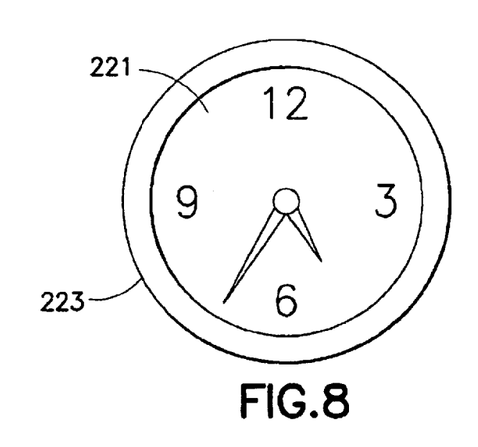
FIG. 8 shows an end view of another first end closure suited for use in the embodiment shown in FIG. 6.

In yet another embodiment shown in FIG. 6, the barrel 218 of the container 210 is not partitioned, and is provided with an opening 220 at the first end 214, where the timepiece 221 is located, and a second end 216 integral with the barrel 218 and that seals the second end. The timepiece 221 is mounted on a closure element 223 that fits on or over the first end 214 in order to seal the interior space from the outside environment. The closure element 223 is provided with a base 222 and a plug 224 attached to the base 222 that, when joined to the barrel 216, seals the opening 220 from the exterior environment and encloses the eyeglasses when they are placed inside the space. The closure element 223 can be provided with a flat end piece 225 onto which the timepiece 221 is positioned, from which piece the plug 224 extends. The plug 224 is dimensioned to fit within the barrel 218 and engage the inner sidewalls of the barrel. Alternatively, the timepiece 221 can be mounted on the back surface of the plug (FIG. 8), which requires the user to remove the closure element 223 in order the view the timepiece. Also, a mirror (not shown) can be mounted on the flat end piece 225 or plug 224 in lieu of the timepiece, or one of such components can be mounted on the first end and the other component can be mounted on the second end.

Figure 9:
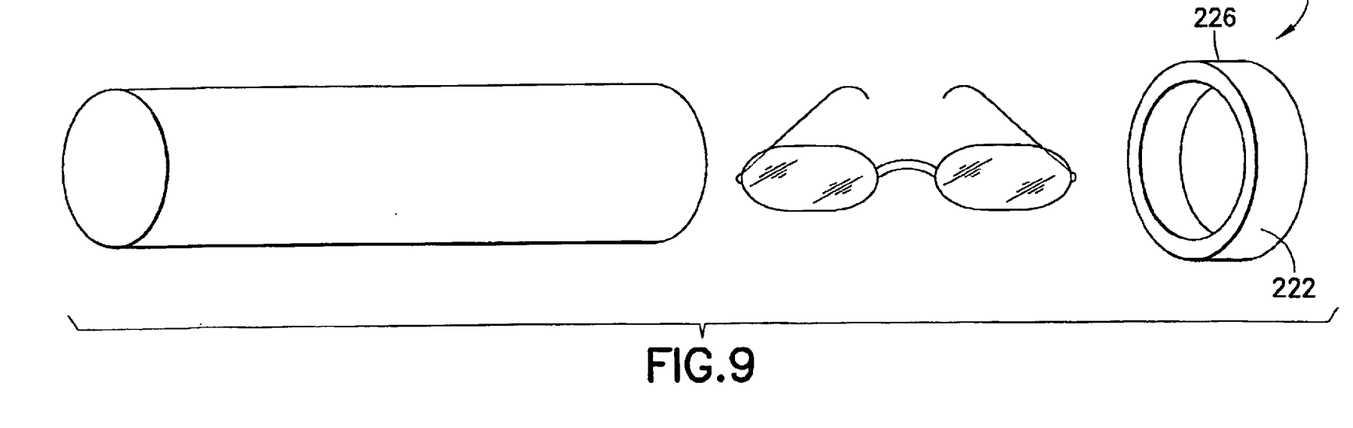
FIG. 9 shows an exploded view of another embodiment of the present invention.
Figure 10:
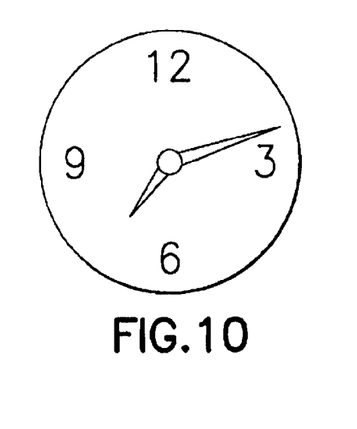
FIG. 10 shows an end view of the first end closure suited for use in the embodiment shown in FIG. 9.
Figure 11:
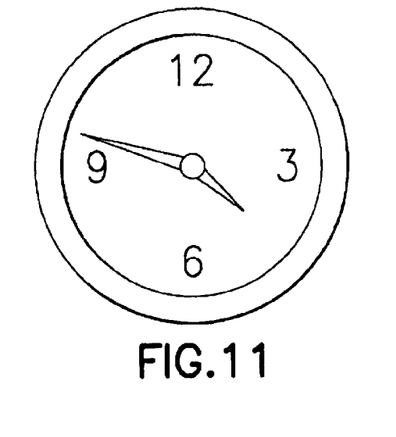
FIG. 11 shows an end view of another first end closure suited for use in the embodiment shown in FIG. 9.

Alternatively, as shown in FIGS. 9–11, the closure element 223 can be provided with a flat end piece 225 onto which the timepiece 221 is positioned, and a skirt 226 that extends perpendicular to the perimeter of the base 222 of the closure element 223. The skirt 226 is dimensioned to fit over the barrel and engage the outer sidewalls of the barrel when the interior space is sealed by the closure element. Alternatively, the timepiece can be mounted on the back surface of the closure element (FIG. 11), which requires the user to remove the closure element 223 in order the view the timepiece. Also, a mirror (not shown) can be mounted on the flat end piece 225 or skirt 226 in lieu of the timepiece, or one of such components can be mounted on the first end and the other component can be mounted on the second end.

Figure 12:
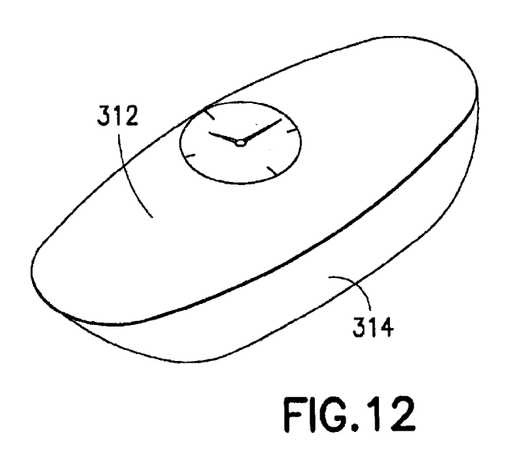
FIGS. 12–13 show a perspective view of another embodiment of the present invention.
Figure 12A:
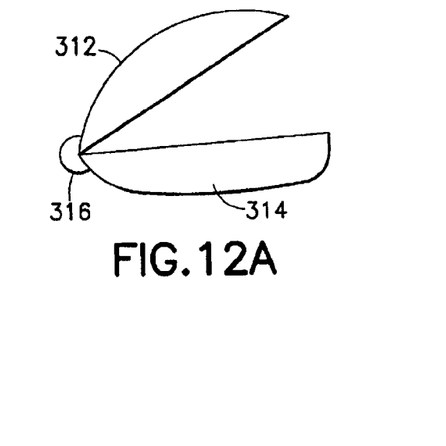
FIG. 12A shows a side elevational view of the embodiment shown in FIGS. 12–13.

In an alternative embodiment shown in FIGS. 12–15, the container 310 has a clam shell arrangement in which there is a first upper half 312, a second lower half 314, joined together at hinge 316 (FIG. 12A). Together the first upper half 312 and the second lower half 314, when closed, define an enclosed interior space into which a pair of eyeglasses can be stored. The container can be opened and closed to provide access to the interior space, or to close it off from the outside environment.

Figure 12B:
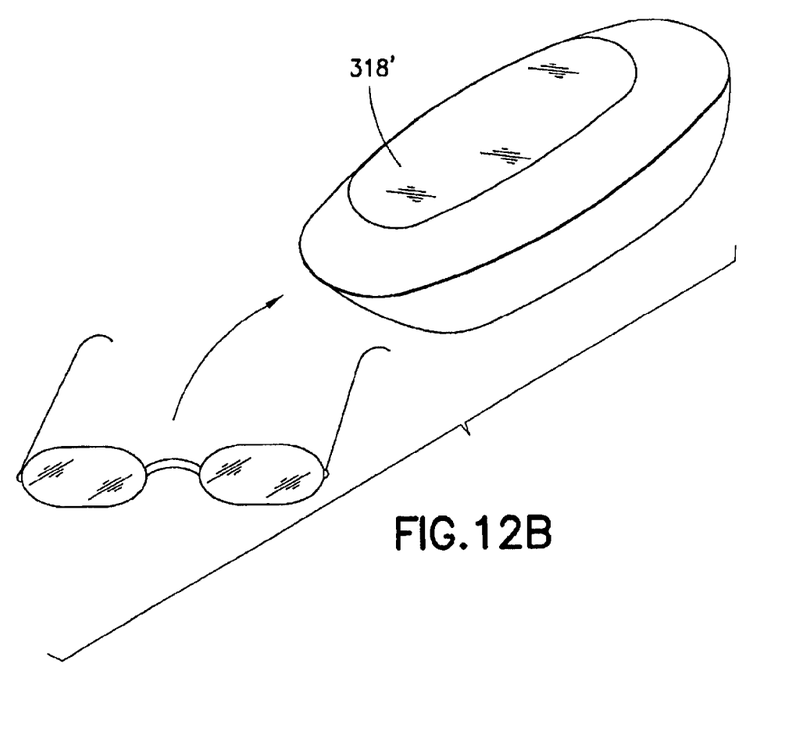
FIG. 12B shows a perspective view of another embodiment of the present invention.
Figure 13:
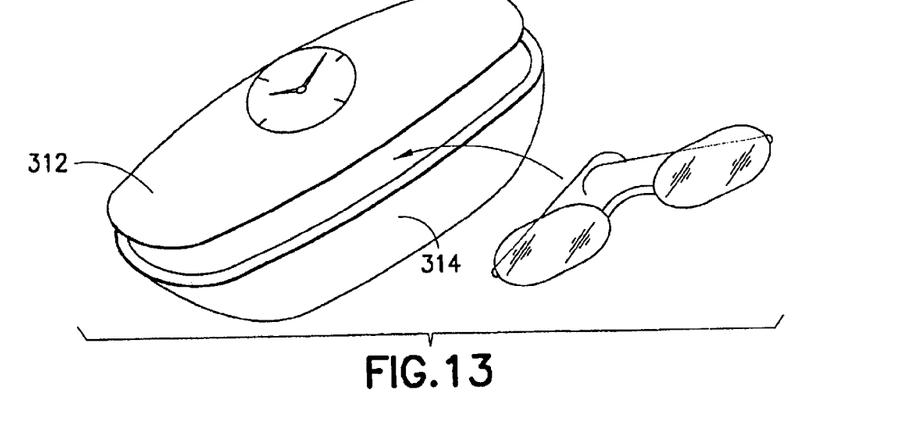
Figure 14:
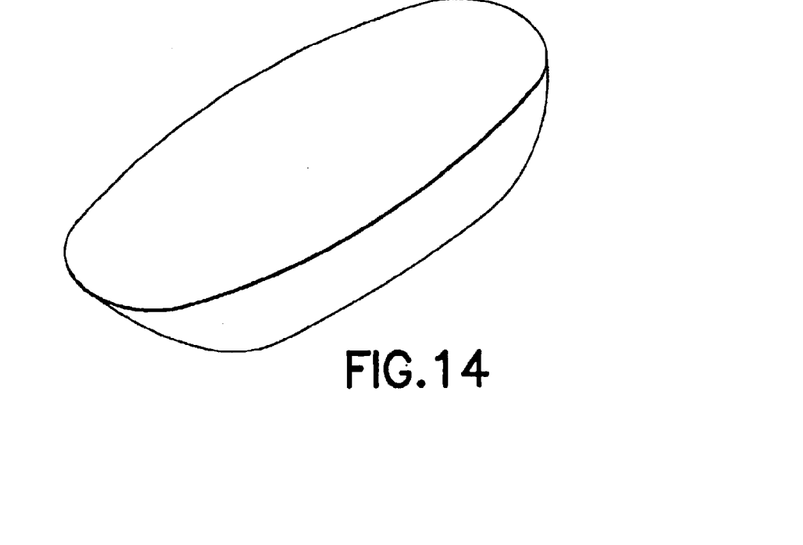
FIGS. 14–15 show a perspective view of another embodiment of the present invention.
Figure 14A:
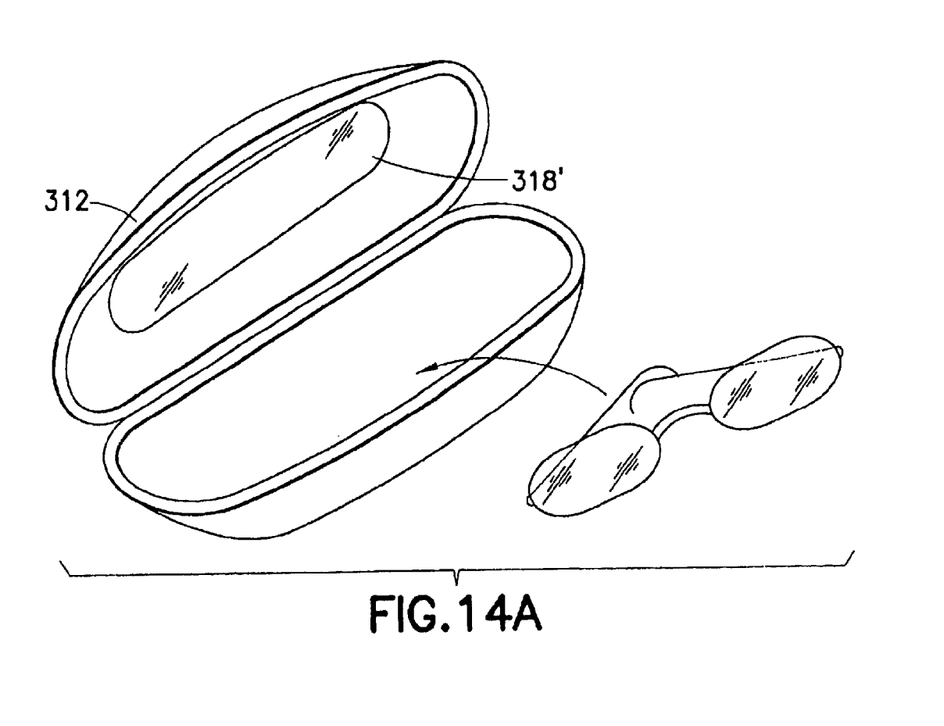
FIG. 14A shows a perspective view of another embodiment of the present invention.
Figure 15:
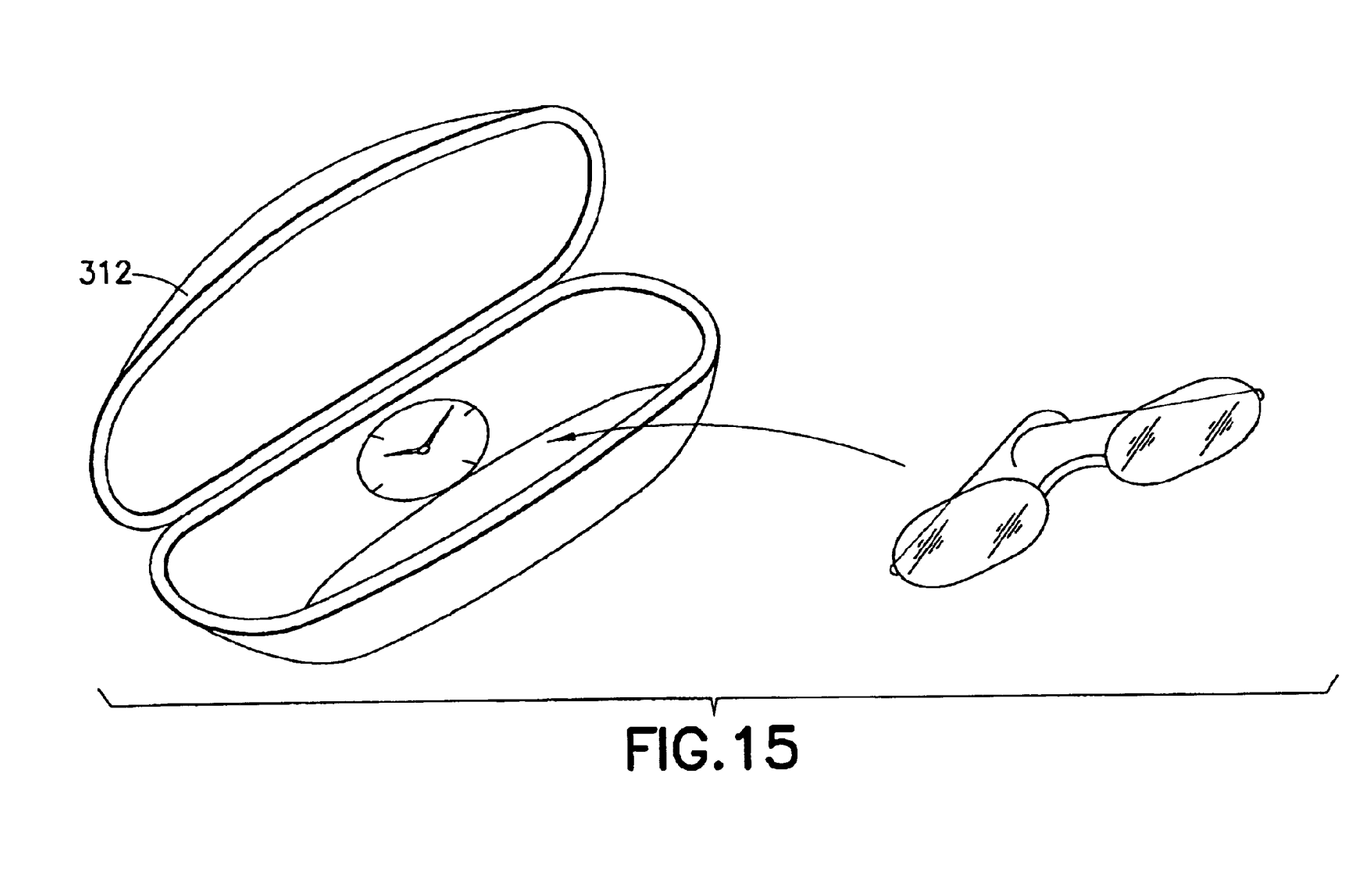
Figures 15A, 15B:
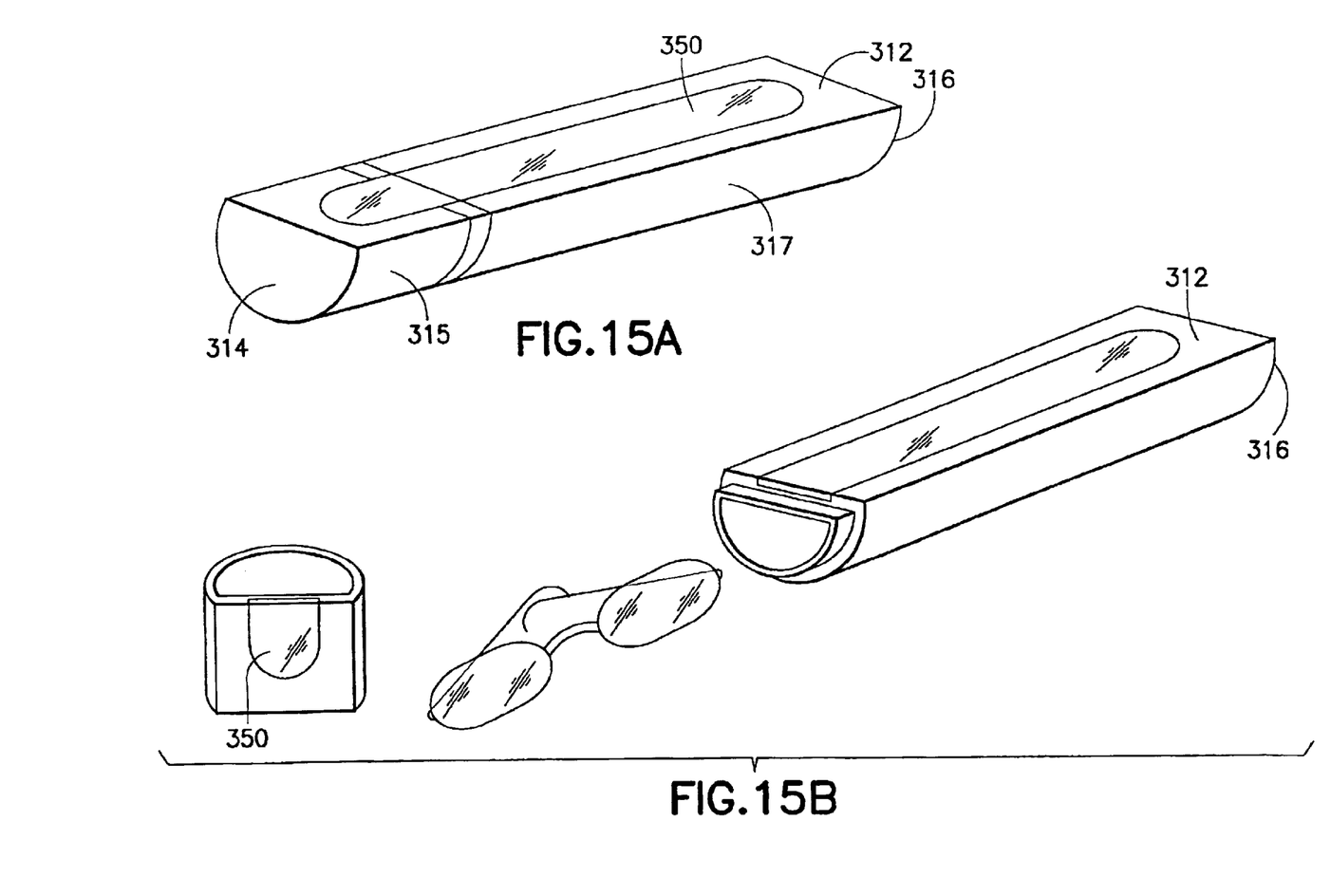
FIG. 15A shows a perspective view of yet another embodiment of the present invention.
FIG. 15B shows an exploded view of the embodiment of FIG. 15A.
Figure 16:
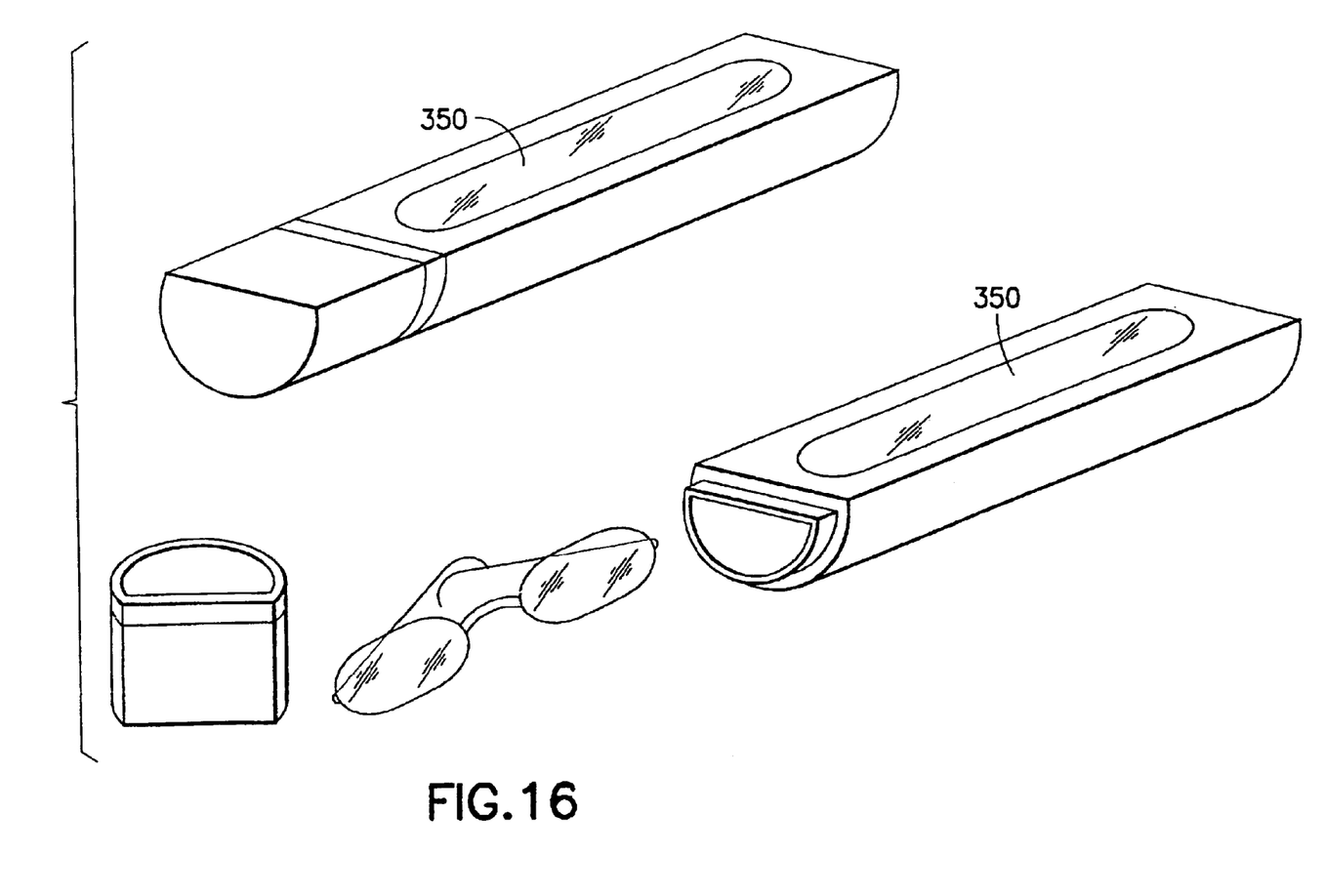
FIG. 16 shows a perspective view of another embodiment of the present invention.
Figure 17:
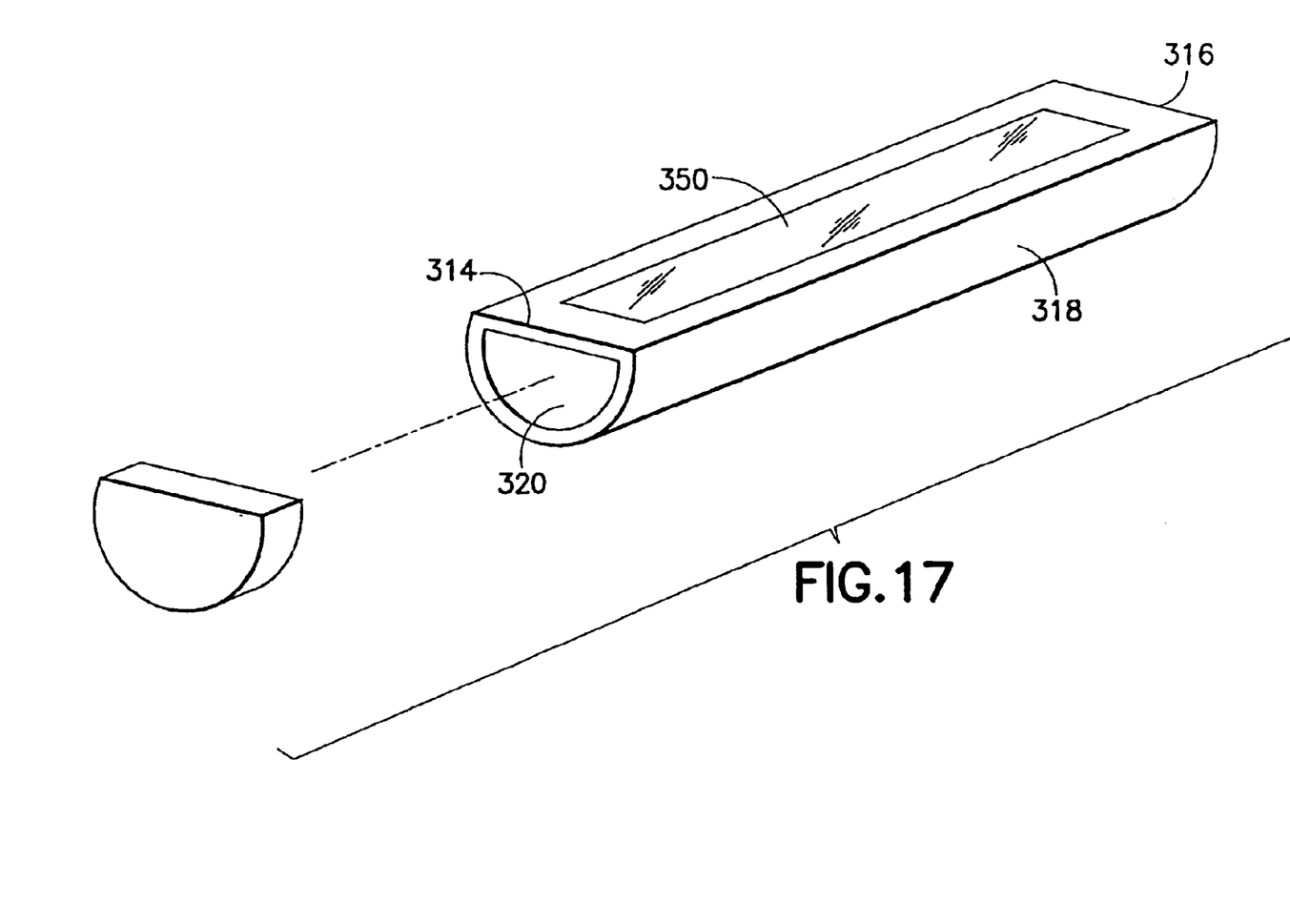
FIG. 17 shows a perspective view of another embodiment of the present invention.

A timepiece 318 can be positioned on the outer sides of one of the halves, such as first half 312. The time piece may be analog or digital. In an alternative embodiment, the time piece is positioned within the case (FIG. 15). In yet another embodiment, a mirror 318' can be positioned on the container in lieu of the timepiece, as shown in FIGS. 12B and 14A, where the mirror is positioned on the outer side of the container (FIG. 13) and on inside of the upper half (FIG. 14A).

FIGS. 15A, 15B, 16, and 17 demonstrate a further embodiments wherein the container 310 is provided with a semicircular shape wherein the container has a flat surface 312 and an arcuate surface 314. The container 310 has a first end 314 and a second end 316 with a barrel therebetween 318. Together, the ends and barrel define an interior space in which eyeglasses can be stored. The barrel has a partition 319 that intersects the length dimension of the container and divides the container into first and second components 315, 317, on which the first and second ends 314, 316 are respectively located. The first and second components 315, 317 can be separated from each other at the partition 319 to,allow access to the interior space, at which time the eyeglasses or other item can be removed or placed in the interior space. When the first and second components 315, 317 are joined, the interior space is sealed from the outside environment. The inner edges of the first and second components 315, 317 may be provided with complimentary profiles to facilitate joinder of the components. For instance, the first component 315 may be provided with a portion having a perimeter that fits within the perimeter of the second component 317 and frictionally engages therewith. This arrangement can also be reversed.

Figure 7:
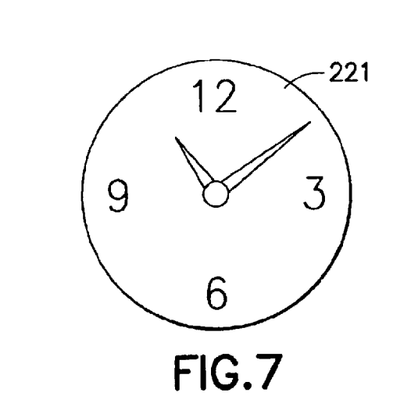
FIG. 7 shows an end view of the first end closure suited for use in the embodiment shown in FIG. 6.

A mirror 350 is provided on the flat surface 312 of the container 310. In one embodiment, the mirror 350 traverses the first and second components 315, 317. See FIG. 15. In an alternative embodiment shown in FIG. 16, the mirror is positioned on just one of the components, in this case the second component 317. In yet another embodiment (FIG. 17), the barrel 318 of the container 310 is not partitioned, and is provided with an opening 320 at the first end 314. The mirror is provided on the flat side: of the body. The first end can be closed as set forth in the description of FIGS. 6–11 by closure element 323 having either the base and plug arrangement of FIGS. 6–8 or the base and skirt arrangement of FIGS. 9–11.

Figure 18:
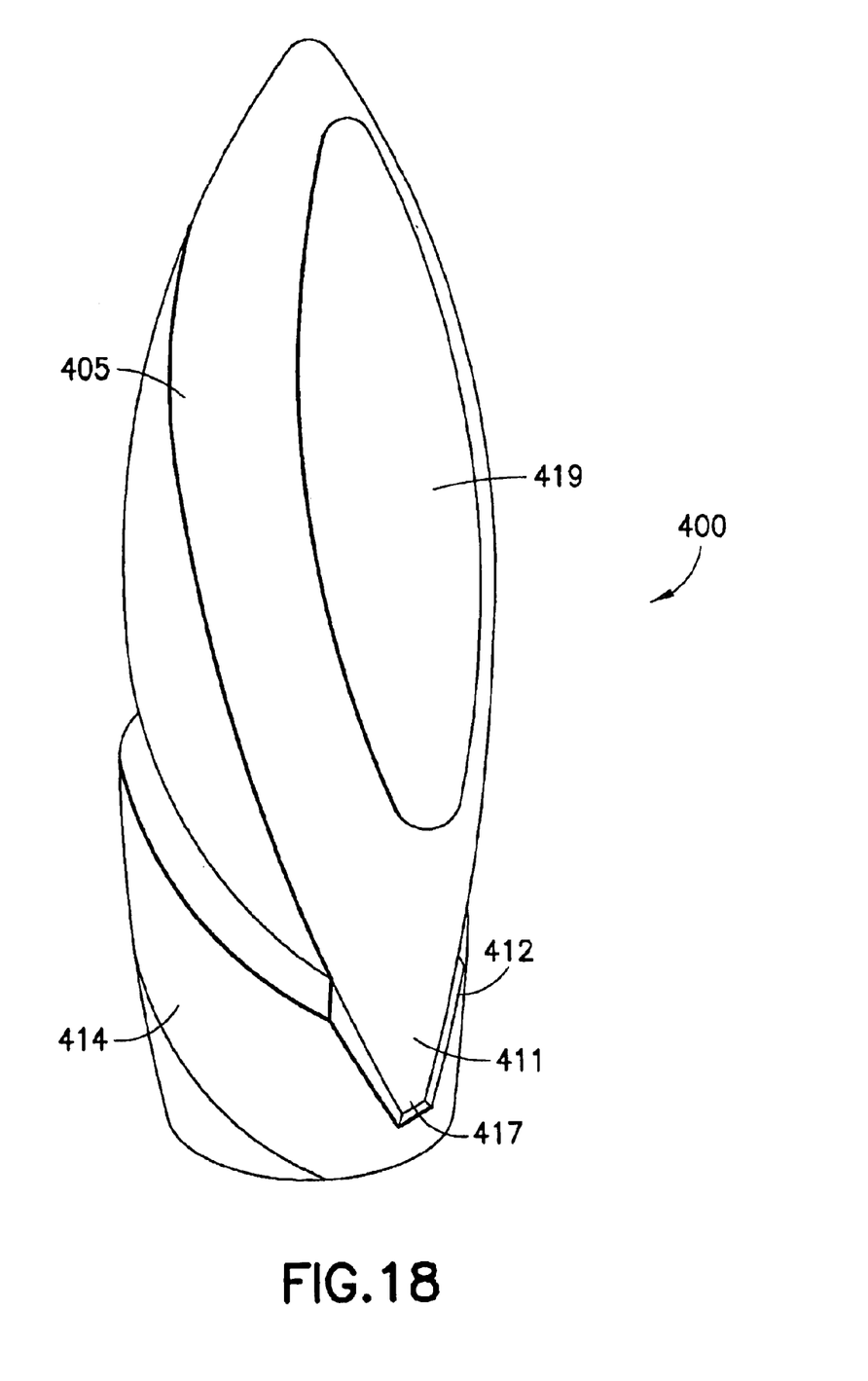
FIG. 18 shows a perspective view of another embodiment of the present invention.

FIG. 18 shows a container for storing eyeglasses 300 that is provided with a mirror 419. The case has a barrel 405. The mirror 419 may be positioned near the tip or the mirror may cover the predominant portion of a barrel side. Although FIG. 18 shows a fingernail shaped housing with tip 417, resting against removable closure element 414, it should be understood that the other configurations are possible.

Figure 19:
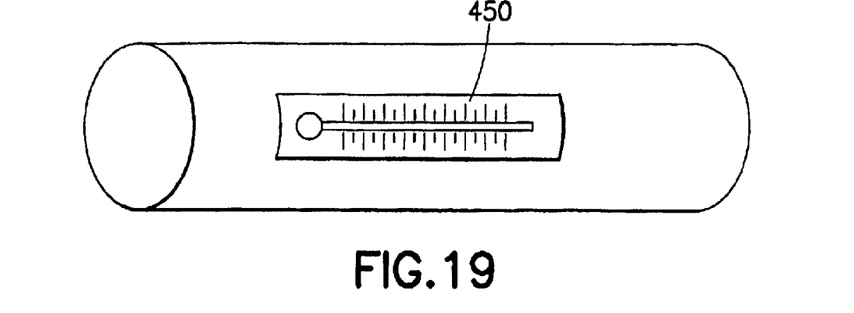
FIGS. 19, 20, 21 and 22 show other items that can be employed in the embodiments disclosed in the present application.
Figure 20:
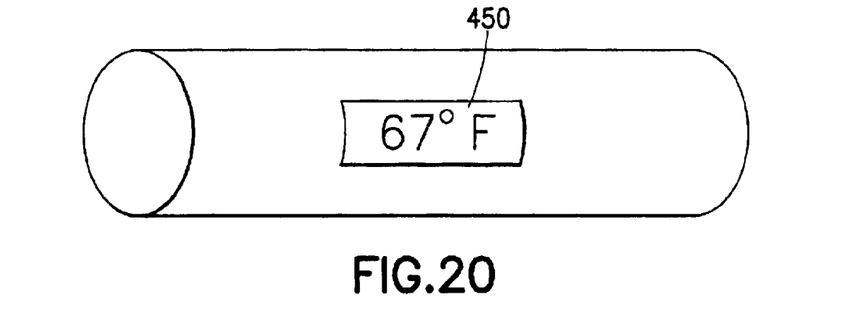
Figure 21:
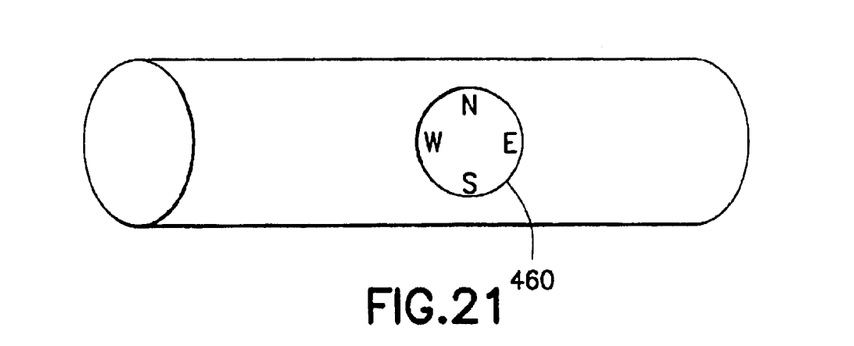
Figure 22:
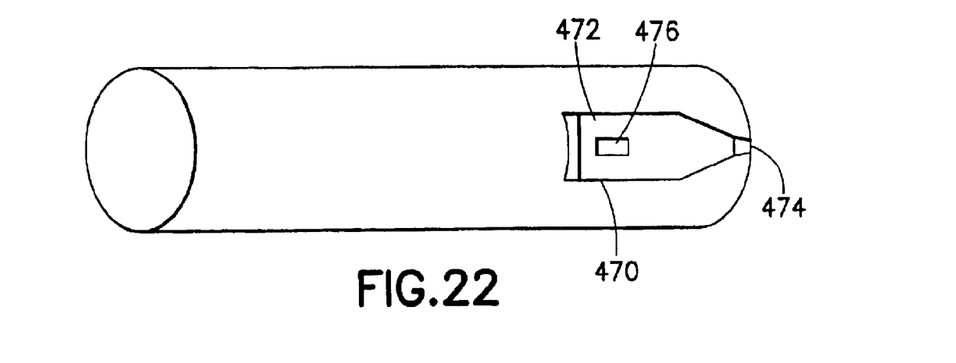

FIGS. 19, 20, 21 and 22 show other items that can be positioned on the eyeglass case. These items can be employed in any of the embodiments previously disclosed, alone or in combination with any of the other items. FIGS. 19 and 20 show analog and digital thermometers 450. FIGS. 21 and 22 show a compass and a laser pointer 470, having a body 472, a laser light emitting tip 474, and a switch 476. Further, the items can be located either on the barrel of the container or on one of the ends of the container.

I claim:

1. An eyeglass case comprised of:

an elongated barrel provided with an opening at a first end of the barrel, the barrel further having a second end integral with the barrel, a removable closure element that seals an interior space from the outside environment when engaged with the first end, and an item selected from the group consisting of: a timepiece and a mirror;

wherein the barrel is defined by a longitudinal axis extending therethrough from the first end of the barrel to the second end of the barrel;

wherein the removable closure element includes a base and a plug attached to the base that, when engaged with the barrel, seals the opening from the exterior environment and encloses the eyeglasses when they are placed in the interior space;

wherein the base is provided with a flat end piece from which the plug extends, wherein the flat end piece is arranged substantially perpendicular to the axis through the barrel, and wherein the timepiece or the mirror is positioned on the flat end piece such that the timepiece or the mirror is viewed substantially along the axis through the barrel.

2. An eyeglass case comprised of:

an elongated barrel provided with an opening at a first end of the barrel, the barrel further having a second end integral with the barrel, a removable closure element that seals an interior space from the outside environment when engaged with the first end, and an item selected from the group consisting of: a timepiece, and a mirror;

wherein the barrel is defined by a longitudinal axis extending therethrough from the first end of the barrel to the second end of the barrel;

wherein the removable closure element includes a base and a plug attached to the base that, when engaged with the barrel, seals the opening from the exterior environment and encloses the eyeglasses when they are placed in the interior space;

wherein the timepiece or the mirror is positioned on an interior surface of the plug such that the timepiece or mirror faces the interior space of the barrel along the longitudinal axis extending therethrough when the removable closure element is attached to the barrel.

3. An eyeglass case comprised of:

an elongated barrel provided with an opening at a first end of the barrel, the barrel further having a second end integral with the barrel, a removable closure element that seals an interior space from the outside environment when engaged with the first end, and an item selected from the group consisting of: a timepiece and a mirror;

wherein the barrel is defined by a longitudinal axis extending therethrough from the first end of the barrel to the second end of the barrel;

wherein the removable closure element includes a base and a skirt that extends substantially perpendicular to a perimeter of the base;

wherein the base is provided with a flat end piece from which the skirt extends, wherein the flat end piece is arranged substantially perpendicular to the axis through the barrel, and wherein the timepiece or the mirror is positioned on the flat end piece such that the timepiece or the mirror is viewed substantially along the axis through the barrel.

4. An eyeglass case comprised of:

an elongated barrel provided with an opening at a first end of the barrel, the barrel further having a second end integral with the barrel, a removable closure element that seals an interior space from the outside environment when engaged with the first end, and an item selected from the group consisting of: a timepiece, and a mirror;

wherein the barrel is defined by a longitudinal axis extending therethrough from the first end of the barrel to the second end of the barrel;

wherein the removable closure element includes a base and a skirt that extends substantially perpendicular to a perimeter of the base;

wherein the base is provided with a flat end piece from which the skirt extends, wherein the flat end piece is arranged substantially perpendicular to the axis through the barrel, and wherein the timepiece or the mirror is positioned on an interior surface of the flat end piece such that the timepiece or mirror faces the interior space of the barrel along the longitudinal axis extending therethrough when the removable closure element is attached to the barrel.

* * * * *